United States Patent [19]
Mauchle

[11] Patent Number: 5,615,980
[45] Date of Patent: Apr. 1, 1997

[54] INJECTOR-FEED DEVICE FOR PNEUMATIC FEED OF POWDER

[75] Inventor: Felix Mauchle, Abtwil, Switzerland

[73] Assignee: GEMA Volstatic AG, St. Gallen, Switzerland

[21] Appl. No.: 472,839

[22] Filed: Jun. 7, 1995

[30] Foreign Application Priority Data

Jun. 8, 1994 [DE] Germany ............... 44 19 987.2

[51] Int. Cl.$^6$ .................................................. B65G 53/66
[52] U.S. Cl. .................. 406/19; 406/31; 406/34; 406/93; 406/138; 406/143; 406/153
[58] Field of Search ................. 406/10, 12, 14, 406/29, 30, 93, 108, 122, 134, 136, 138, 141, 142, 143, 144, 151, 152, 153, 19, 31, 34

[56] References Cited

U.S. PATENT DOCUMENTS 4,747,731  5/1988  Nagasaka et al. ................ 406/14

FOREIGN PATENT DOCUMENTS 184994  6/1987  European Pat. Off. .
4012190  10/1991  Germany .
4114097  11/1992  Germany .

*Primary Examiner*—Andrew C. Pike
*Attorney, Agent, or Firm*—Schwartz & Weinrieb

[57] ABSTRACT

An injector-conveyor device for the pneumatic conveying of powder, particularly powdered coating material, in order to measure the amount of powder conveyed, measures indirectly the vacuum produced in an injector (4) by having a stream of air measured with respect to its amount of flow or pressure drop in a throttled measurement channel (30) which places the outside atmosphere (32) in fluid communication with the vacuum chamber (10) of the injector (4). In order to avoid errors in measurement due to pressure variations in a powder suction channel (8), an equalization air inlet (56) is provided by means of which a small amount of equalization air is introduced into the powder suction channel (8) in order to make the pressure variations occurring therein of higher frequency and smaller with respect to the amplitudes of variation.

13 Claims, 2 Drawing Sheets

INJECTOR-FEED DEVICE FOR PNEUMATIC FEED OF POWDER

FIELD OF THE INVENTION

The invention relates to an injector-feed device for the pneumatic feed of powder, particularly powdered coating material, pursuant to the specification as more fully set forth hereinafter.

BACKGROUND OF THE INVENTION

From U.S. Pat. No. 4,747,731, an injector-feed device for the pneumatic feed of powder is known, wherein the device conducts fluidized powder from a powder container by means of a horizontal channel arrangement. The horizontal channel arrangement consists of a sensor nozzle, a detector channel which lies axially opposite the nozzle and, downstream from it, a channel outlet which is expanded in cross section relative to the detector channel, a squeeze valve, an injector nozzle disposed axially within a channel segment which has a greater diameter than that of the nozzle, a diffusor channel which is axially opposite the injector nozzle and downstream from it, and a transport channel which follows downstream from the diffusor channel, all arranged serially one after the other. A powder inlet within the powder container extends vertically upwardly into an interstice between the sensor nozzle and the detector channel, so that fluidized powder which rises into the inlet is captured by a carrier gas which flows out of the sensor nozzle and is then transported to the injector nozzle through the detector channel. Propellant gas flows out of the injector nozzle into the diffusor channel arranged downstream from it, and transports the mixture of powder and carrier gas through the transport line to a consumer. Downstream from the diffusor channel, a gas adjustment channel opens into the transport line, by means of which additional carrier gas can be conducted into the powder/air stream. By means of the additional carrier gas, the flow velocity of the powder/air mixture can be changed or adjusted. Because of the horizontal disposition or orientation of the detector channel, powder would settle in it if the powder were not driven through the detector channel by the carrier gas from the sensor nozzle. The amount of gas required to transport a certain amount of powder per unit of time therefore consists of the total amount of the carrier gases from the sensor nozzle and the propellant gas from the injector nozzle. In order to measure the flow amount of the carrier gas, one throttle channel for feeding a small amount of gas opens into the sensor nozzle, and another throttle channel opens into the outlet of the detector channel. The pressures in the throttle channels are measured by means of a differential pressure measurement device. The flow amount of the carrier gas is determined from the differential pressure. Furthermore, a membrane vale is provided which regulates the feed of the propellant gas to the injector nozzle. Rod-like submersible pumps with an injector at the upper end of a pump are known from European patent document EP 0 184 994 B2 and German patent document DE-OS 40 12 190A1. The arrangement of the injector at the bottom end of the pump is known from German patent document DE-OS 41 14 097 A1.

In the pneumatic feed of powder, especially the feed of powdered coating material to a spray nozzle for spray-coating objects, the amount of powder transported per unit of time and the total amount of gas contained in the powder stream are important operational factors. The individual gas or feed amounts, in total, must correspond to the desired total gas amount. The individual gas or air amounts can be measured in a simple manner, for example by means of flow measurement devices, before they mix with the powder. However, a precise measurement of the amount of powder transported per unit of time is a problem.

OBJECT OF THE INVENTION

The invention is intended to accomplish the task of creating a system by means of which the amount of powder transported per unit of time can be measured precisely and continuously, and in a simple manner.

SUMMARY OF THE INVENTION

The foregoing task is accomplished, according to the invention, by the system or apparatus more fully set forth hereinafter.

The invention is based on the recognition by the inventor that the vacuum generated by the injector for drawing or inducting the powder is proportional to the amount of powder transported per unit of time. The vacuum or partial vacuum generated by the injector is relatively small. There are as yet no devices which can measure this vacuum or partial vacuum in a cost-effective and continuous manner. The inventor therefore proposes that the partial pressure generated by the injector be used to draw in or induce air from the outside atmosphere by means of a throttle channel, and to measure the amount of air drawn in per unit of time. The amount of air can be measured by means of a commercially available flow measurement device or a pressure drop measurement device which measures the pressure drop of the air drawn in as it occurs in the throttle line. The flow-through amount or the pressure drop is directly proportional to the vacuum or partial vacuum generated by the injector. This vacuum or partial vacuum is proportional to the amount of powder transported per unit of time. The throttle line is referred to as the measurement channel in the following description.

The measurement of the amount of powder transported per unit of time as proposed by the invention works accurately even if changes in the flow resistance occur in the powder/air line, for example due to powder deposits or kinks in the line. An increase in the flow resistance results in a corresponding pressure increase in the partial vacuum area of the injector and therefore in a lesser amount of air which is drawn in from the outside atmosphere by means of the measurement line.

In the powder intake channel, by way of which the injector draws powder out of the powder container, pressure variations can also occur due to changing powder concentrations and a changing powder level in the powder container from which powder is drawn to the injector by means of the powder intake channel. In order to stabilize the flow in the powder intake channel, according to the invention, a compressed air inlet is disposed within the upstream end of the powder intake channel, which inlet blows a small amount of equalization air axially into the upstream end of the powder intake channel. This reduces the amplitude of pressure variations in the powder intake channel and increases the variation frequency, resulting in shorter regulation times. To reduce the influence of a change in the powder level in the powder container on the pressure in the powder intake channel, the inlet of the powder intake channel is formed by at least one lateral opening which opens perpendicular to the powder intake channel into a chamber which is formed between the compressed air inlet for equalization air and the powder intake channel and has a larger cross section than the powder intake channel. In this way, the compressed air inlet can create a partial vacuum, if desired, by means of an injector effect, and thereby support the feed of the powder.

Further characteristics of the invention are contained in the following detailed description.

BRIEF DESCRIPTION OF THE DRAWINGS

Various other objects, features, and attendant advantages of the invention will be more fully appreciated from the following detailed description when considered with reference to the drawings, which illustrate a preferred embodiment as an example, in which like reference characters designate like or corresponding parts throughout the several views, and wherein.

DETAILED DESCRIPTION OF THE PREFERRED EMBODIMENT

Figure 1:
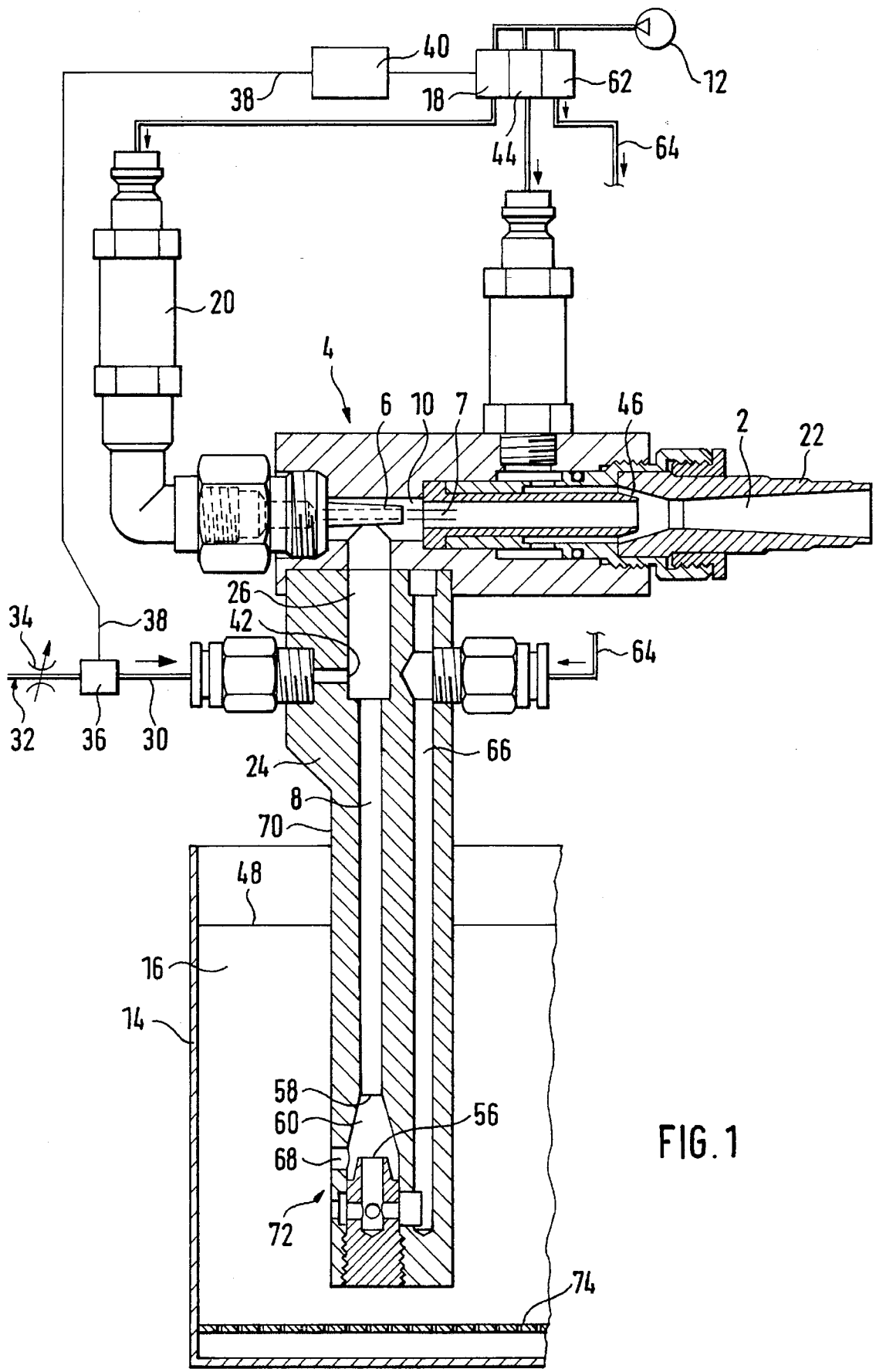
FIG. 1 is, schematically, an axial cross section through an injector-feed device according to the invention.
Figure 2:
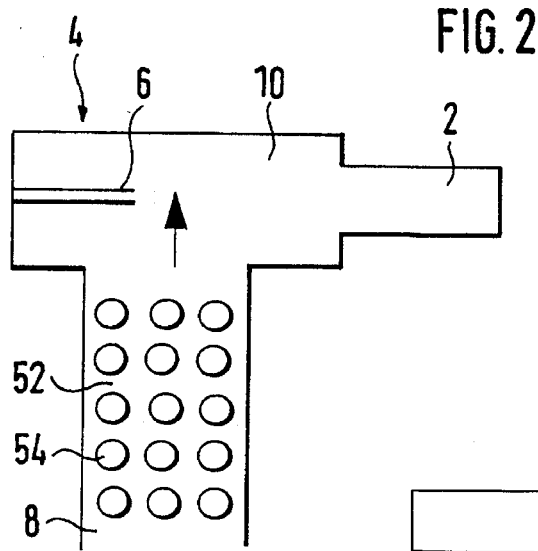
FIG. 2 is a schematic view of the injector and the upper channel segment of the powder intake channel of the injector-feed device shown in FIG. 1, arranged vertically and connected in terms of flow to the partial vacuum chamber, showing the powder/air mixture within the powder intake channel as being homogeneous during a first time segment.

The injector feed device according to the invention shown in FIG. 1, for the pneumatic feed of powder, particularly powdered coating material, contains a powder/air channel 2, an injector 4 with an injector nozzle 6 directed essentially axially in the powder/air channel 2, and a powder intake channel 8 which is connected in terms of flow to a partial vacuum chamber 10 of the injector 4. A feed air stream 7 of a compressed air source 12, which is driven from the injector nozzle 6 into the powder/air channel 2, draws powder 16 from a powder container 14 through the powder intake channel 8 into the partial vacuum chamber 10, in which the powder mixes with the feed air stream 7 and then flows through the powder/air channel 2 together with the feed air. The compressed air source 12 is connected with the injector nozzle 6 in terms of flow by means of a pressure regulator 18 and by means of a compressed air line 20.

The downstream end segment 22 of the powder/air channel 2 shown in FIG. 1 can be structured as an atomizer nozzle or can be provided with a spray device to spray the powder onto an object to be coated by means of a hose.

The powder intake channel 8 extends vertically in the longitudinal direction through an immersion pipe 24 which is arranged vertically and is immersed in the powder 16 of the powder container 14 from the top to the bottom. An upper end segment 26 of the powder intake channel 8 has an expanded flow cross section relative to the upstream segment of channel 8, which cross section is connected to the partial vacuum chamber 10 and forms a partial vacuum area together with the chamber 10, in which the feed air stream 7 of the injector nozzle 6 generates an essentially homogeneous partial vacuum or vacuum. The partial vacuum generated by the feed air stream 7, however, is effective throughout the entire powder intake channel 8 at different strength values. The partial vacuum area 10, 26 is connected or can be connected with the outside atmosphere 32, in terms of flow, by means of measurement channel 30 which is provided with an adjustable flow throttle 34. The partial vacuum or vacuum which prevails in the partial vacuum area 10, 26 draws in air from the outside atmosphere 32, by means of the measurement channel 30, which is greatly throttled by the flow throttle 34. The measurement channel 30 is provided with a measurement device 36, which generates a measurement signal on a signal line 38, as a function of the air flowing through the measurement channel 30 from the outside atmosphere 32 into the partial vacuum area 10, 26. This measurement signal is a measure of the air flowing through the measurement channel 30 per unit of time and therefore is also a measure of the amount of powder transported through the powder/air channel 2 per unit of time. The measurement signal can be an electrical, pneumatic, or hydraulic signal, and accordingly, its signal line 38 can also be an electrical, pneumatic, or hydraulic line which is functionally connected with a regulation device 40. The downstream end 42 of the measurement channel 30 is preferably connected, in terms of flow, with the partial vacuum chamber 10. In the embodiment according to FIG. 1, the downstream end 42 of the channel 30 is connected, in terms of flow, with the downstream end segment 26 of the powder intake channel 8, wherein in view of the fact that this end segment 26 has such a large cross section, essentially the same partial vacuum or the same vacuum prevails in segment 26 as in the partial vacuum chamber 10, so that this end segment 26 can be viewed as part of the partial vacuum chamber 10.

The measurement device 36 is preferably a flow measurement device which generates the measurement signal as a function of the amount of outside air flowing through the measurement channel 30 per unit of time. In accordance with another preferred embodiment, the measurement device 36 can be a pressure drop measurement device which generates the measurement signal on the signal line 38 as a function of the pressure drop of the outside air flowing through the measurement channel 30. To measure the pressure drop, all that is needed is to measure the air pressure in the measurement channel 30 at a measurement site downstream from the flow throttle 34, since this pressure can be compared with the pressure of the outside air at the outside atmosphere inlet 32. If the measurement channel 30 has a capillary-like narrow cross section, no additional flow throttle 34 is needed. In this case, a pressure drop relative to the pressure of the outside atmosphere can be measured in the measurement channel 30 in a similar manner, downstream from its outside atmosphere inlet 32. For the function of the measurement channel 30, all that is necessary is that the outside atmosphere is connected, in terms of flow, with the partial vacuum chamber 10, in a throttled manner, so that the partial vacuum in the partial vacuum chamber 10 is not detrimentally reduced or influenced by the outside atmosphere.

For coating an object with powder, but also for other applications, the amount of powder transported per unit of time is an important operating factor, since the layer thickness applied to an object, for example, is dependent on this factor. Another criterion is the total amount of air transported per unit of time, which is transported through the powder/air line 2 together with the powder. Here it must be taken into consideration that a certain amount of feed air is needed by the injector nozzle 6 for a certain amount of powder, in order to generate a vacuum which corresponds to the amount of powder in the partial vacuum chamber 10, by means of which powder 16 is drawn from the powder container 14. If this amount of air is less than the amount of air which is necessary to transport the powder through the powder/air channel 2 without having powder deposits occur in the channel 2, then additional air has to be supplied in order to increase the flow velocity in the powder/air channel 2. Since this additional air is supposed to influence the vacuum or partial vacuum in the partial vacuum chamber 10 as little as possible, or not at all, because otherwise the amount of powder transported per unit of time changes, the additional air is blown into the upstream segment of the powder/air channel 2 by the compressed air source 12, by means of a second pressure regulator 44, and an additional air nozzle 46, downstream from the injector 4. The additional air nozzle 46 is preferably a ring-slit nozzle in accordance with FIG. 1, which concentrically surrounds the powder/air channel 2 and opens into it at a slant, in the flow direction of the powder.

The vacuum or partial vacuum prevailing in the vacuum chamber 10 is quite variable and varies even if the air feed rate of the injector nozzle 6 and the additional air rate of the additional air nozzle 46 as well as the powder level 48 in the powder container 14 are kept constant. Such uncontrolled variations of the partial vacuum in the partial vacuum chamber 10 also result, in an undesirable manner, in variations of the powder amount transported per unit of time in the powder/air channel 2. The causes for the variations of the vacuum in the partial vacuum chamber 10 are described in the following, with reference to FIGS. 2 to 5, in which the injector 4 and the powder intake channel 8 are shown schematically. FIGS. 2 to 5 represent operating situations that occur during consecutive time segments. During the first time segment shown in FIG. 2, the powder/air mixture 52 in the powder intake channel 8 is homogeneous. The vacuum generated in the partial vacuum chamber 10 by the injector 4 draws in a constant air volume stream from the powder container 14 through the powder column located in the powder intake channel 8, which column is schematically shown by powder particles 54. Here, the air volume stream drawn in is constant and the vacuum in the partial vacuum chamber 10 is also constant.

Figure 3:
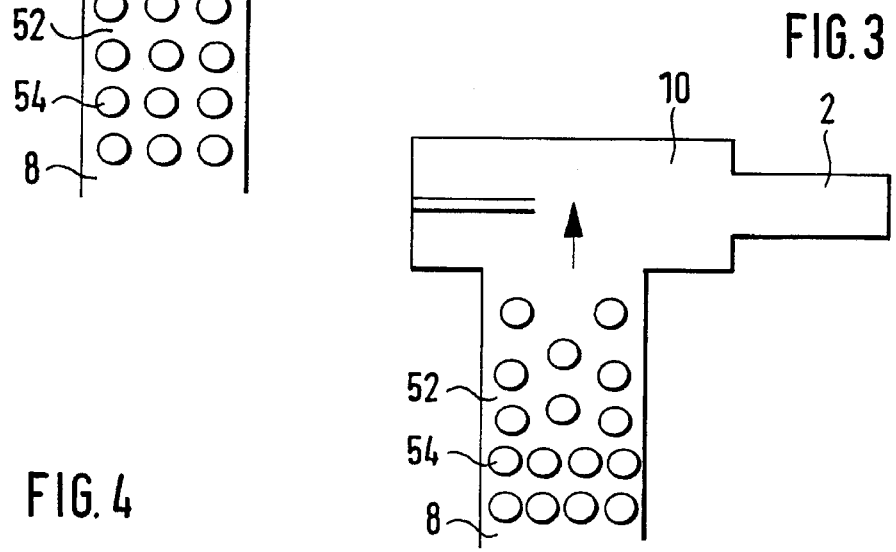
FIG. 3 is a schematic view similar to that of FIG. 2 showing, however, commencement of the compacting of the powder particles within the powder intake channel during a second time segment.

During the second time segment, shown in FIG. 3, the vacuum present in the partial vacuum chamber 10 of the injector 4 draws a large part of the air present in the powder intake channel 8 away, causing the vacuum in the partial vacuum chamber 10 to be reduced, that is, the pressure in the chamber 10 increases. This means that the air volume stream drawn out of the powder intake channel 8 increases and the partial vacuum in the partial vacuum chamber 10 decreases. This causes the powder particles 54 remaining in the powder intake channel 8 to be compacted.

Figure 4:
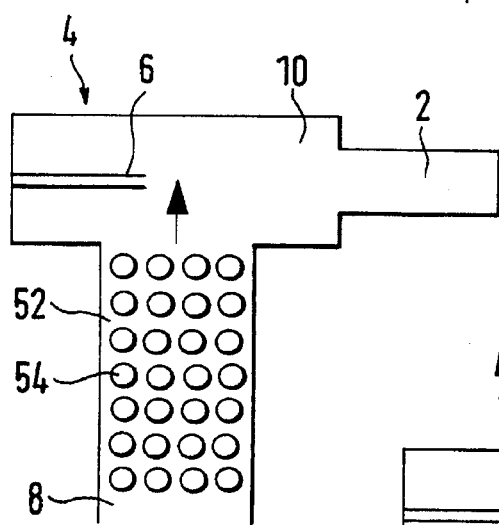
FIG. 4 is a schematic view similar to that of FIGS. 2 and 3 showing, however, further compacting of the powder particles within the powder intake channel during a third time segment.

During the third time segment, shown in FIG. 4, the powder particles 54 in the powder intake channel 8 have compacted greatly and now only allow a small air volume stream flow from the powder container 14 through the powder column 52 in the powder intake channel 8. Because of this effect, the vacuum in the partial vacuum chamber 10 now suddenly increases again. During this third time segment, the air volume stream therefore becomes smaller and the injector vacuum in the partial vacuum chamber 10 becomes larger.

Figure 5:
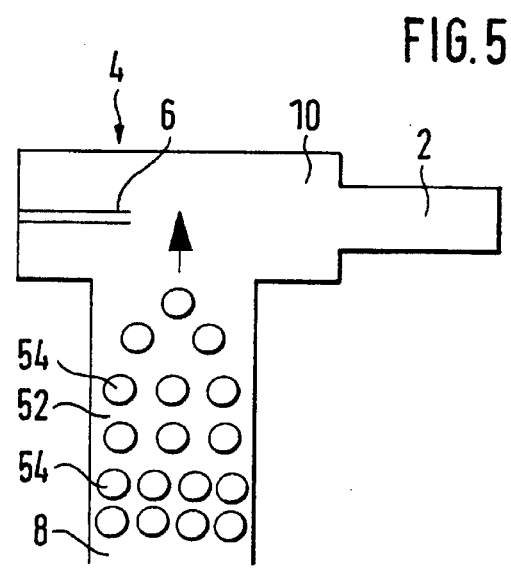
FIG. 5 is a schematic view similar to that of FIGS. 2–4 showing, however, the disruption of the compacted powder particles of FIG. 4 during a fourth time segment.

During the fourth time segment, shown in FIG. 5, a vacuum has built up in the partial vacuum chamber 10 of the injector 4, until it is able to tear apart the compacted powder particles 54 in the powder intake channel 8. This causes the resistance for the air volume stream in the powder intake channel 8 to decrease and the vacuum in the partial vacuum chamber 10 to again decrease. During this fourth time segment, the air volume stream in the powder intake channel 8 therefore again becomes larger and the vacuum in the partial vacuum chamber 10 again becomes smaller.

These variations detrimentally affect the measurement results of the measurement channel 30 and therefore also the regulation of the feed of transport gas and additional gas. To reduce this disadvantage, according to the invention, an equalization air inlet 56 in the form of a second injector nozzle is disposed coaxially with and upstream of the upstream end 58 of the powder intake channel 8, and blows equalization air axially into the upstream end 58 of the powder intake channel 8 through means of a second partial vacuum chamber 60 formed therebetween. The equalization air is passed to the second injector nozzle 56 from the compressed air source 12 by means of a third pressure regulator 62, a compressed air line 64, and an equalization air channel 66 which extends parallel to the powder intake channel 8. The powder intake channel 8 and the equalization air channel 66 are located within the immersion tube 24, in the bottom end segment of which the second injector nozzle 56 is also arranged. The powder inlet for the powder intake channel 8 is formed by one or more powder inlet openings 68, which are disposed perpendicular to the axis of the immersion pipe 24, that is, they extend radially through the immersion pipe 24 and connect the outside surface 70 of the immersion pipe 24 with the intake channel 8 and thereby the powder 16 located in the powder container 14 with the second partial vacuum chamber 60 of the second injector 72, in terms of flow, which latter injector 72 is formed by the equalization air inlet 56 and the second partial vacuum chamber 60. As seen in FIG. 1, the equalization air inlet 56 is disposed within the immersion pipe 24 so as to be at an axial position which is substantially aligned with the radially oriented powder inlet opening 68.

The regulation device 40 regulates the feed of the transport air as delivered through line 20, the additional air as delivered through nozzle 46, and the equalization air as delivered through line 64 and channel 66 as a function of the measurement signal of the measurement line 38, by means of the pressure regulators 18, 44, and 62.

The powder container 14 is preferably structured in such a way that the powder 16 contained in it floats in an air stream, the air of which flows through a perforated container bottom 74 into the interior of the container 14. Because of this "fluidized state" of the powder 16 in the container 14, the powder 16 has flow properties similar to air or a liquid. A much smaller amount of air per unit of time than that supplied by means of the first injector nozzle 6 is brought into the powder stream by the equalization air inlet 56. The equalization air of the equalization air inlet 56 can but does not have to draw powder from the powder container 14 in the second partial vacuum chamber 60. The equalization air is transported through this inlet 56 at a small, constant amount per unit of time, and thereby has a stabilizing effect on the pressure variations in the powder intake channel 8 that were described above. The equalization air of the equalization air inlet 56, which can be structured as an injector nozzle in the manner described, makes the variations as stated higher in frequency, that is, shorter and faster, and smaller in amplitude. This makes the regulation adjustment times of the control device 40, which tries to equalize the variations indicated, significantly shorter. In experiments, it was possible to reduce the regulation adjustment times to one-third of their normal values.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. An injector-conveyor system, for pneumatic conveyance of powder coating material, comprising:

a powder container containing a supply of said powder coating material;

a powder-air channel for discharging air and said powder coating material toward an object to be coated;

a vacuum chamber disposed upstream of said powder-air channel;

a powder intake channel having one end thereof fluidically connected to said supply of said powder coating material contained within said powder container, and another end thereof fluidically connected to said vacuum chamber;

means for discharging a stream of said air through said vacuum chamber and into said powder-air channel for creating a vacuum within said vacuum chamber whereby an amount of said powder coating material from said powder container is drawn through said powder intake channel, into said vacuum chamber, mixed with said stream of said air, and discharged as a mixture of said stream of said air and said amount of said powder coating material through said powder-air channel and toward said object to be coated;

conduit means fluidically connecting said vacuum chamber to atmospheric air for drawing an amount of said atmospheric air through said conduit means and into said vacuum chamber for mixing with said powder coating material and said stream of said air; and means disposed within said conduit means for measuring said amount of said atmospheric air flowing through said conduit means and into said vacuum chamber and for generating a measurement signal which is proportionally indicative of said amount of said powder coating material being drawn into said vacuum chamber, mixed with said stream of said air and said amount of said atmospheric air, and discharged along with said stream of said air and said amount of atmospheric air through said powder-air channel.

2. The system as set forth in claim 1, further comprising:

an adjustable flow throttle disposed within said conduit means for adjustably throttling said amount of said atmospheric air drawn through said conduit means.

3. The system as set forth in claim 1, wherein:

said powder intake channel is defined within an immersion pipe immersed within said supply of said powder coating material;

a downstream end of said powder intake channel has an enlarged cross-sectional area fluidically connected to said vacuum chamber so as to form an enlarged vacuum chamber therewith; and said conduit means has a downstream end thereof fluidically connected to said enlarged cross-sectional area of said powder intake channel.

4. The system as set forth in claim 3, wherein:

said immersion pipe has a longitudinal axis;

said powder intake channel has a longitudinal axis which is disposed parallel to said longitudinal axis of said immersion pipe; and at least one radially oriented inlet opening is defined within a sidewall portion of said immersion pipe so as to fluidically connect said powder intake channel with said supply of said powder coating material disposed within said powder container.

5. The system as set forth in claim 4, further comprising:

an equalization air inlet for discharging equalization air into an upstream end of said powder intake channel so as to reduce pressure variations within said vacuum chamber and said powder intake channel.

6. The system as set forth in claim 5, wherein:

said equalization air inlet is disposed within said immersion pipe at an axial position which is substantially aligned with said at least one radially oriented inlet opening.

7. The system as set forth in claim 6, further comprising:

a second vacuum chamber defined within said immersion pipe and interposed between said equalization air inlet and said upstream end of said powder intake channel for facilitating drawing said powder coating material into said powder intake channel from said powder container.

8. The system as set forth in claim 5, further comprising:

an equalization air channel defined within said immersion pipe and disposed parallel to said powder intake channel for providing said equalization air inlet with said equalization air.

9. The system as set forth in claim 8, further comprising:

third pressure regulator means operatively connected to said measuring means for regulating said equalization air into said equalization air channel as a function of said measurement signal generated by said measuring means.

10. The system as set forth in claim 4, wherein:

said means for discharging said stream of said air through said vacuum chamber and into said powder-air channel comprises an injector nozzle which is substantially coaxially aligned with said powder air channel; and said longitudinal axis of said immersion pipe is disposed substantially perpendicular to a longitudinal axis of said injector nozzle and said powder-air channel.

11. The system as set forth in claim 1, further comprising:

means for discharging a stream of additional air into said powder-air channel at a position downstream from said vacuum chamber so as to insure that sufficient air is conducted through said powder-air channel so as to transport said mixture of said stream of said air and said amount of said powder coating material through said powder-air channel while not affecting the vacuum within said vacuum chamber.

12. The system as set forth in claim 11, further comprising:

second pressure regulator means operatively connected to said measuring means for regulating said stream of additional air into said powder-air channel as a function of said measurement signal generated by said measuring means.

13. The system as set forth in claim 1, further comprising:

pressure regulator means for regulating said stream of said air through said vacuum chamber as a function of said measurement signal generated by said measuring means.

* * * * *